(12) United States Patent
Rucci et al.

(10) Patent No.: US 11,003,244 B2
(45) Date of Patent: May 11, 2021

(54) SYSTEM AND METHOD FOR REAL-TIME HIGH-RESOLUTION EYE-TRACKING

(71) Applicant: University of Rochester, Rochester, NY (US)

(72) Inventors: Michele Rucci, Rochester, NY (US); Ruei-Jr Wu, Brighton, NY (US); Zhetuo Zhao, Rochester, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 16/550,831

(22) Filed: Aug. 26, 2019

(65) Prior Publication Data

US 2020/0064914 A1 Feb. 27, 2020

Related U.S. Application Data

(60) Provisional application No. 62/723,169, filed on Aug. 27, 2018.

(51) Int. Cl.

| | |
|---|---|
| *G06F 3/01* | (2006.01) |
| *G02B 27/00* | (2006.01) |
| *H04N 5/225* | (2006.01) |
| *G02B 27/01* | (2006.01) |

(52) U.S. Cl.
CPC ......... *G06F 3/013* (2013.01); *G02B 27/0093* (2013.01); *G02B 27/0172* (2013.01); *G06F 3/017* (2013.01); *H04N 5/2256* (2013.01); *G02B 2027/0138* (2013.01); *G02B 2027/0178* (2013.01)

(58) Field of Classification Search
CPC . G06F 3/013; G02B 27/0093; G02B 27/0172; H04N 5/2256
USPC .......................................................... 715/863
See application file for complete search history.

(56) References Cited

U.S. PATENT DOCUMENTS

| | | | |
|---|---|---|---|
| 4,287,410 A | 9/1981 | Crane et al. | |
| 6,193,371 B1 * | 2/2001 | Snook | A61B 3/1005 351/212 |
| 8,360,578 B2 * | 1/2013 | Nummela | G02B 27/0081 351/209 |
| 9,198,571 B2 * | 12/2015 | Kiderman | A61B 3/0091 |
| 10,402,950 B1 * | 9/2019 | Geng | G06T 5/006 |
| 2014/0154650 A1 * | 6/2014 | Stack | A61B 5/163 434/236 |
| 2015/0070262 A1 * | 3/2015 | Peters | G06F 3/013 345/156 |
| 2015/0160726 A1 * | 6/2015 | Sullivan | G02B 27/0093 345/156 |
| 2017/0205876 A1 * | 7/2017 | Vidal | G06F 1/163 |
| 2018/0129279 A1 * | 5/2018 | Melman | G06F 3/013 |
| 2018/0164880 A1 * | 6/2018 | Kim | G06K 9/00604 |

(Continued)

*Primary Examiner* — William D Titcomb
(74) *Attorney, Agent, or Firm* — Harris Beach PLLC

(57) ABSTRACT

A method for determining gaze location includes: providing a gaze tracking device including an illumination source to illuminate an eye of an observer at an angle of about 20 degrees to 40 degrees relative to a resting eye position of the eye, a camera or an imager includes at least one focusing lens, the camera or imager to acquire sequences of digital images of the eye, and a processor to run a gaze tracking process; and running the gaze tracking process to locate at least two Purkinje reflections of the illuminating source from the eye in the images. A gaze tracking system and a gaze tracking device are also described.

26 Claims, 14 Drawing Sheets

(56) References Cited

U.S. PATENT DOCUMENTS

2018/0232048 A1* 8/2018 Popovich .............. G02F 1/2955
2019/0018485 A1* 1/2019 Aleem ............... G02B 27/0172
2019/0235247 A1* 8/2019 Norden ................... G06F 3/012

* cited by examiner

SYSTEM AND METHOD FOR REAL-TIME HIGH-RESOLUTION EYE-TRACKING

CROSS-REFERENCE TO RELATED APPLICATIONS

This application claims priority to and the benefit of U.S. provisional patent application Ser. No. 62/723,169, SYSTEM AND METHOD FOR REAL-TIME HIGH-RESOLUTION EYE-TRACKING, Aug. 27, 2018, which application is incorporated herein by reference in its entirety.

STATEMENT REGARDING FEDERALLY FUNDED RESEARCH OR DEVELOPMENT

This invention was made with government support under EY018363 awarded by National Institutes of Health. The government has certain rights in the invention.

FIELD OF THE APPLICATION

The application relates to eye tracking and particularly to eye tracking for providing an estimate of gaze location.

BACKGROUND

Eye movements are measured in a wide variety of fields, ranging from clinical applications to human-machine interaction. An eye-tracker provides an estimation of gaze location.

SUMMARY

According to one aspect, a method for determining gaze location includes: providing a gaze tracking device including an illumination source to illuminate an eye of an observer at an angle of about 20 degrees to 40 degrees relative to a resting eye position of the eye, a camera or an imager includes at least one focusing lens, the camera or imager to acquire sequences of digital images of the eye, and a processor to run a gaze tracking process; and running the gaze tracking process to locate at least two Purkinje reflections of the illuminating source from the eye in the images.

In one embodiment, the method further includes a step wherein an acquired frame or image is ignored on detection of a blink.

In another embodiment, following the step of providing, tuning the gaze tracking process to an individual eye by a first calibration process wherein the observer looks in at least two directions.

In yet another embodiment, following the step of providing, localization of a line of sight in a scene viewed by the observer is refined by an optional second calibration process that includes showing a location to the observer; and following the step of running, calibrating the gaze tracking process to set or correct at least one offset based on the location shown to the observer.

In yet another embodiment, the step of running the gaze tracking process includes: performing a) and b) in any order, or in parallel: estimating a P1 location marker $X_1$; estimating a P4 location marker $X_4$, and outputting a gaze position as $f(X_4-X_1)$, where X denotes a two-dimensional variable which indicates a position within an image of the eye, and f is an average mapping function.

In yet another embodiment, the step a) includes defining a P1 region of interest (ROI) to localize P1 to ensure a substantially optimal behavior of a localization parametrization process algorithm that yields $X_1$.

In yet another embodiment, step c) further includes predicting a P2 ROI to reject inaccuracies caused by P2 in estimating $X_1$.

In yet another embodiment, P1 location of step a) and the estimating a P4 location step b) are performed in parallel on a parallel processor.

In yet another embodiment, the step of running the gaze tracking includes: performing a) and b) in any order, or in parallel: a) defining a P1 region of interest (ROI) to localize a Dual-Purkinje Image (DPI) P1; b) estimating $X_0$ to define a location marker of a pupil P0 image; c) based on step a) and step b), predicting a P4 ROI; d) estimating a P1 location marker $X_1$; e) estimating a P4 location marker $X_4$ based on the P4 ROI; and f) outputting a gaze position as $f(X_4-X_1)$, where X denotes a two-dimensional variable which indicates a position on two Cartesian axes.

In yet another embodiment, the step c) includes predicting a P4 $(x_4, y_4)$ according to the equation $$\begin{bmatrix} x_4 \\ y_4 \end{bmatrix} = \vec{k} \left( \begin{bmatrix} x_0 \\ y_0 \end{bmatrix} - \begin{bmatrix} x_1 \\ y_1 \end{bmatrix} \right) + \vec{b} + \begin{bmatrix} x_1 \\ y_1 \end{bmatrix},$$

where average gains and offsets $\vec{k}$ and $\vec{b}$ are optionally refined during a calibration procedure.

In yet another embodiment, step f) includes outputting a gaze position as $f(X_4-X_1)$ if step e) succeeds; otherwise outputting the gaze position as $f(X_1-X_0)$.

In yet another embodiment, a ROI is based on a previous $X_0$.

In yet another embodiment, a P1 detection of step a) and a pupil localization of step b) are performed in parallel on a parallel processor.

According to another aspect, a gaze tracking system includes a gaze tracking device. The tracking device includes a mechanical structure adapted to position a gaze tracking device in a substantially fixed physical relation to a head of an observer. An illumination source is mechanically coupled to the mechanical structure. The illumination source is adapted to illuminate an eye of the observer at an angle of about 20 degrees to 40 degrees relative to a resting eye position. A lens is disposed in an optical path of the illumination source. A camera or an imager includes at least one focusing lens. The camera or imager is mechanically coupled to the mechanical structure and adapted to image the eye. A processor is configured to run at least one gaze tracking process adapted to locate at least two or more Purkinje reflections of the illuminating source.

In one embodiment, the gaze tracking device includes a dichroic mirror disposed in an optical path of the camera or imager.

In another embodiment, the mechanical structure includes a head-fixed platform wherein the head of the observer is substantially immobilized.

In yet another embodiment, the head-fixed platform includes a motorized stage to position optical components of the gaze tracking device relative to an eye of the observer.

In yet another embodiment, the mechanical structure includes a head-mounted platform mounted on the head of the observer.

In yet another embodiment, the mechanical structure includes a helmet or a pair of glasses.

In yet another embodiment, the gaze tracking device includes a mask disposed on the optical path of the illumination source to the eye.

In yet another embodiment, the gaze tracking device includes at least one polarizing filter disposed within the optical path to the imager of the gaze tracking device.

In yet another embodiment, the illumination source includes an infrared light emitting diode (LED) or a low-power laser.

According to yet another aspect, a gaze tracking device includes a mechanical structure adapted to position a gaze tracking device in a substantially fixed physical relation to a head of an observer. An illumination source is mechanically coupled to the mechanical structure, the illumination source adapted to illuminate an eye of an observer at an angle of about 20 degrees to 40 degrees relative to a resting eye position. A lens is disposed in an optical path of the illumination source. A camera or an imager includes at least one focusing lens. The camera or imager is mechanically coupled to the mechanical structure and adapted to image the eye.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Figure 1A:
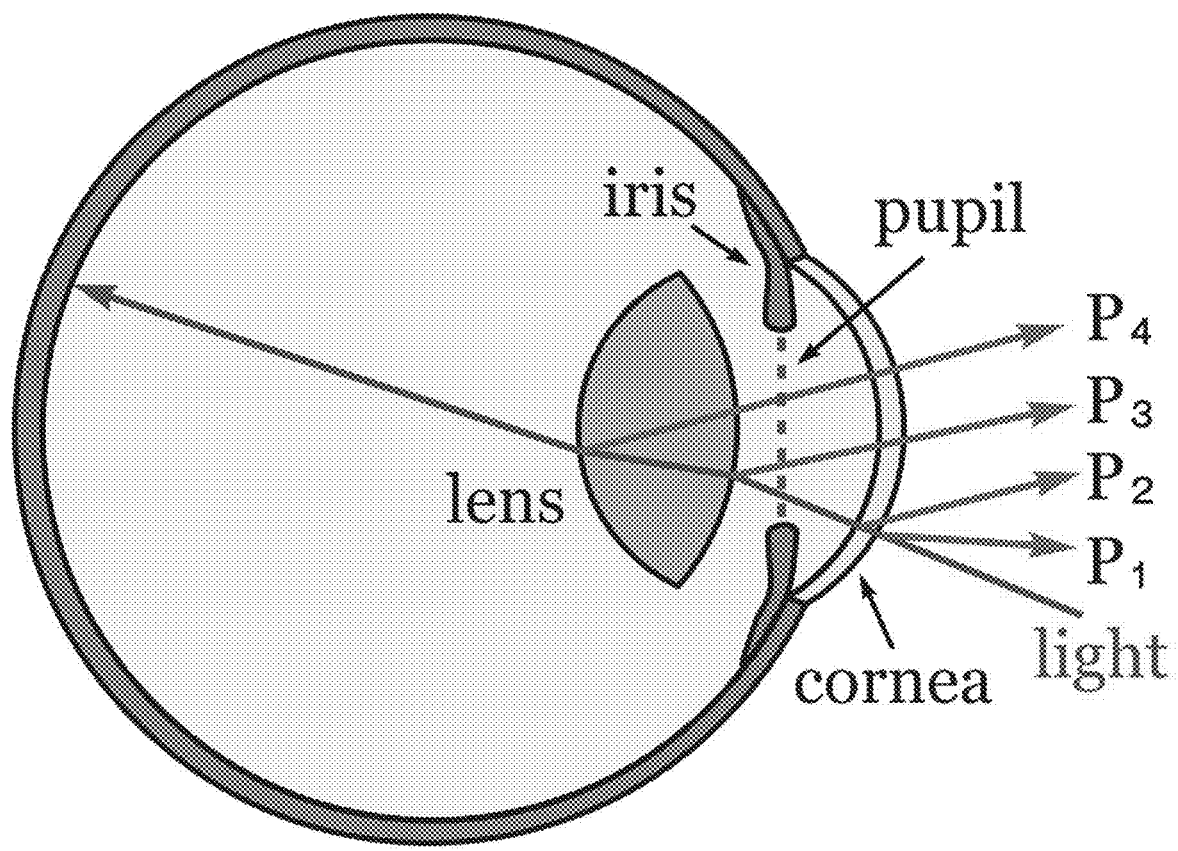
FIG. 1A shows a drawing of an eye illustrating Purkinje Images P1-P4.

The need to precisely measure eye movements occurs in a wide variety of fields, ranging from clinical applications to human-machine interaction. However, existing commercial eye-trackers only enable coarse estimation of gaze location. The average gaze-localization error available in commercial eye-trackers (approximately 1 degree in visual angle) is insufficient for most applications, including the rapidly emerging fields of virtual and augmented reality. These applications should know where an observer is looking in a scene with much higher accuracy than that allowed by current eye-trackers.

To achieve higher precision in their analyses, oculomotor scientists have long worked with more sophisticated methods for eye-tracking and gaze-tracking. For example, Dual-Purkinje Image (DPI) tracking is a non-invasive method that relies on the simultaneous tracking of reflections (Purkinje images) from two different surfaces of the eye. This approach has been used for almost 30 years. DPI tracking can provide tracking data with extremely high spatial and temporal resolutions. These systems would possess the precision required by a huge variety of emerging applications, however DPI tracking has remained restricted to use by a few specialized laboratories. The reason for this, is that existing DPI eye-trackers are cumbersome, very expensive, and fragile opto-electronic devices, which are notoriously difficult to operate. A long felt need for levels of resolution analogous to that of the DPI using modern and simpler to operate technologies has remained elusive.

Definitions

Resting position of an observer's eye—the orientation of the line of sight at the center of the range in which the eye-tracker operates. In most applications, the resting position of the observer's eye indicates straight ahead fixation. In applications in which the observer should to maintain gaze in a certain orientation, the resting position of the observer's eye indicates the desired eye orientation.

Location markers—Location markers are positional descriptors that indicate a location of each feature within an image. A location marker is used for each of the four features: the pupil ($X_0$), P1 ($X_1$), P2 ($X_2$) and P4 ($X_4$), where use of bold hereinbelow, denotes two-dimensional variables that indicate the position on two Cartesian axes of an image of the eye.

Imager frame/observation—the output provided by the imager at each cycle. Typically, an image is acquired by a digital camera, however any suitable camera or imager can be used.

Frame rate—the number of independent observations provided by the imager in a second.

Gaze/eye tracking—the process that determines the orientation of the eye relative to the head of the observer or relative to another predefined reference frame. It determines in which direction the observer looks.

Gaze localization—the process that determines the position of the line of sight within the scene viewed by the observer. Many eye-tracking applications determine what the observer is looking at, more than an amount by which the eye rotated.

This Application describes a new eye-tracker system (including a new eye tracking device) and method that achieves resolution higher than DPI tracking alone, without incurring traditional limitations. The new system builds on the principle of DPI tracking by adding new additional intelligence in the tracking process algorithms, which include modeling of the eye and predictions on how the image reflections should move. The physical device or apparatus according to the application uses a minimal number of components and is suitable for miniaturization and inclusion in head-mounted virtual reality displays. The tracking process algorithms provide a real-time performance which achieve high recording speeds suitable for both scientific and clinical applications. Furthermore, the process is applicable to the lower speeds of many devices (such as virtual and augmented reality systems) by using predictions in the positions of some of the tracked features. The new system and method described hereinbelow in detail, has the potential to finally bring the long sought after high-resolution eye-tracking outside the walls of specialized laboratories opening the door to a vast potential market.

The new system and method is based on several innovations, both in the physical structure of the components (device or apparatus) and the processing of eye-tracking signals (method or process).

This Application describes a system and method that enable fast high-resolution eye-tracking without many of the limitations of prior art DPI systems used in specialized laboratories. Unlike previous DPI applications, the new method described in more detail hereinbelow relies on the acquisition and processing of sequences of high-resolution digital pictures of the eye. The gaze tracking device does not use actively moving parts as part of the gaze direction determination process (e.g. there are no electromechanical servos which were present in gaze tracking devices of the prior art). Multiple innovations are present both in the physical apparatus (device and system) and in the processing methods. These innovations include (1) an apparatus with a minimal number of stationary components suitable for being used in both table-mounted and head-mounted versions; (2) the use of reliable markers for tracking Purkinje reflections; these are markers specifically selected to be minimally affected by artifacts; (3) the use of pupil information to predict the positions of the second and fourth Purkinje reflections, an approach that both improves accuracy and enables application of the method at the relatively low frame rates of many commercial applications, such as virtual and augmented reality applications; (4) an optional calibration procedure that tunes the tracking process to the individual eye for improving measurements of eye rotations; and (5) an optional calibration procedure that enables precise localization of the line of sight in the scene viewed by the observer.

The system operates as an enhanced, more precise, and highly robust DPI within the central region around the resting position of the eye, and as a standard corneal reflection eye-tracker in peripheral regions. This approach ensures a broad range of tracking with a large central region of very high precision. It was realized that an internal eye model can predict the position of relevant tracking features as well as potential noise sources. These predictions are used (a) to shape the regions in which tracking process algorithms operate, an approach that ensures robustness and application to eyes with different shapes; and (b) to determine the location of known sources of artifacts, so that their influences can be mitigated. The internal model is an optical/geometrical model of the eye with parameters adjusted during an initial calibration to match the position of the various features in the image. This model includes: A) knowledge of the center of the pupil, $X_0$, and the position of the first corneal reflection, $X_1$, which enables prediction of the position of the fourth corneal reflection, $X_4$. B) knowledge of the center of the pupil, $X_0$, and the position of the first corneal reflection, $X_1$, which enables prediction of the position of the second corneal reflection, $X_2$, a source of tracking artifact. FIG. 1B shows an exemplary frame image of the eye as seen by the camera or imager of the system. The features used for tracking are highlighted.

The tracking process converts the relative positions of the tracked features in the digital image into the orientation of an average human eye. An optional calibration in which the observer looks in at least two predetermined directions enables tuning the method to the individual characteristics of the observer's eye.

A further fast gaze-contingent calibration has been developed to: establish accurate localization of the line of sight in the visual scene.

The process algorithms provide a robust implementation of the approach with minimal number of computations. These process algorithms enable tracking both at low and high frame rates and/or applications which require minimal power consumption.

A specific arrangement of optical and electronic components substantially guarantees accurate eye-tracking over a large field of view. The gaze tracking device includes an illumination source to illuminate an observer's eye at an angle of about 20 degrees to 40 degrees relative to the resting eye position of the observer's eye. A camera or an imager includes at least one focusing lens. The camera or imager acquires an image of a cornea and pupil of the observer's eye. A processor runs a gaze tracking process. A gaze tracking process locates at least at least two or more Purkinje reflections of the illuminating source in the image.

The camera is optically positioned frontal to the eye either directly, or indirectly by a mirror, such as a dichroic mirror. More eccentric locations are also functional in applications tolerant to a decrement in resolution and range of DPI tracking. The illuminator, any suitable source of illumination, is ideally positioned at about 20 degrees to 40 degrees, both in azimuth and elevation, from the position of the line sight defining the center of the desired tracking region. This location yields the largest range of tracking. The method is tolerant to changes in this angle, however the range of DPI tracking will be reduced. Precise angular alignment of the illuminator allows for a clear separation of P1 and P4 as well as for the positioning of these reflections in regions of the image free from potential confounds. Confounds are regions where P1 and P4 cannot be reliably tracked.

In some embodiments, a dichroic mirror enables frontal imaging of the eye to provide an unobstructed observer view. Use of an infrared illuminator enables measurement of the line of sight without interference with the observer's visual stimulation. In some embodiments, precise optical control of the size of the infrared beam light enables a broad region of uniform illumination of the eye, which translates into a broad field of accurate tracking in DPI mode. Small deviations from collimation in the light beam enable delivery of higher energy to P4, enhancing the contrast of this intrinsically weak reflection relative to the strong P1. Use of optional patterned mask and temporal modulation of the light source enable structured illumination in the creation of the Purkinje images, facilitating tracking in difficult conditions. Also, use of polarizing filters removes spurious reflections in the image of the eye, improving tracking performance.

Selection of a minimum number of components enhances robustness. Unlike the old implementation of the DPI method, the device or apparatus of the new system and method does not possess any fragile component nor moving elements. The system and method can operate both in table-mounted and head-mounted configurations. In the former configuration, optical and electronic components are mounted on a platform with three linear degrees of freedom. In the latter configuration, components are directly mounted on a device attached to the observers' head. A lack of mobile components ensures that the system is capable of handling normal head motion and shaking. The computationally efficient tracking process algorithms allow for a fast operation and/or a minimal consumption of power in head-mounted applications.

Dual-Purkinje Images (DPI)

Figure 1B:
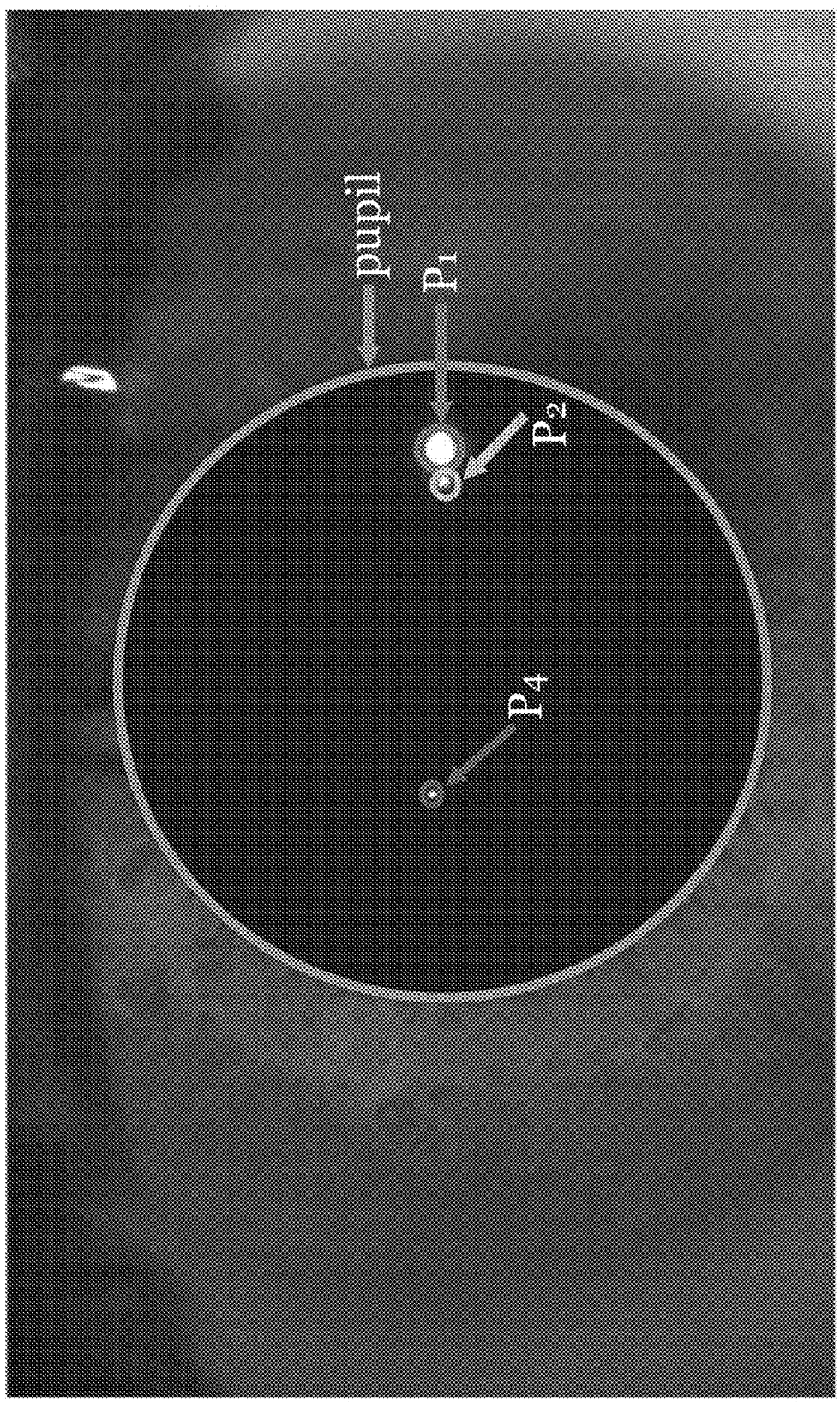
FIG. 1B shows an exemplary frame image of the eye as seen by the camera of the system.

FIG. 1A shows a drawing of an eye illustrating Purkinje Images P1-P4. As a beam of incident light goes through the cornea and the lens, it generates reflections at each surface it encounters (Purkinje Images P1-P4). The method described hereinbelow uses at least two of these reflections, together with information about the pupil (P0).

Method

The new method relies on reliably detecting the offset between P1 and P4 based on the digital images of the eye provided by the imager and converting this offset into eye orientation and/or (depending on the needs of the specific application) position of the line of sight in the scene viewed by the observer.

Figure 2A:
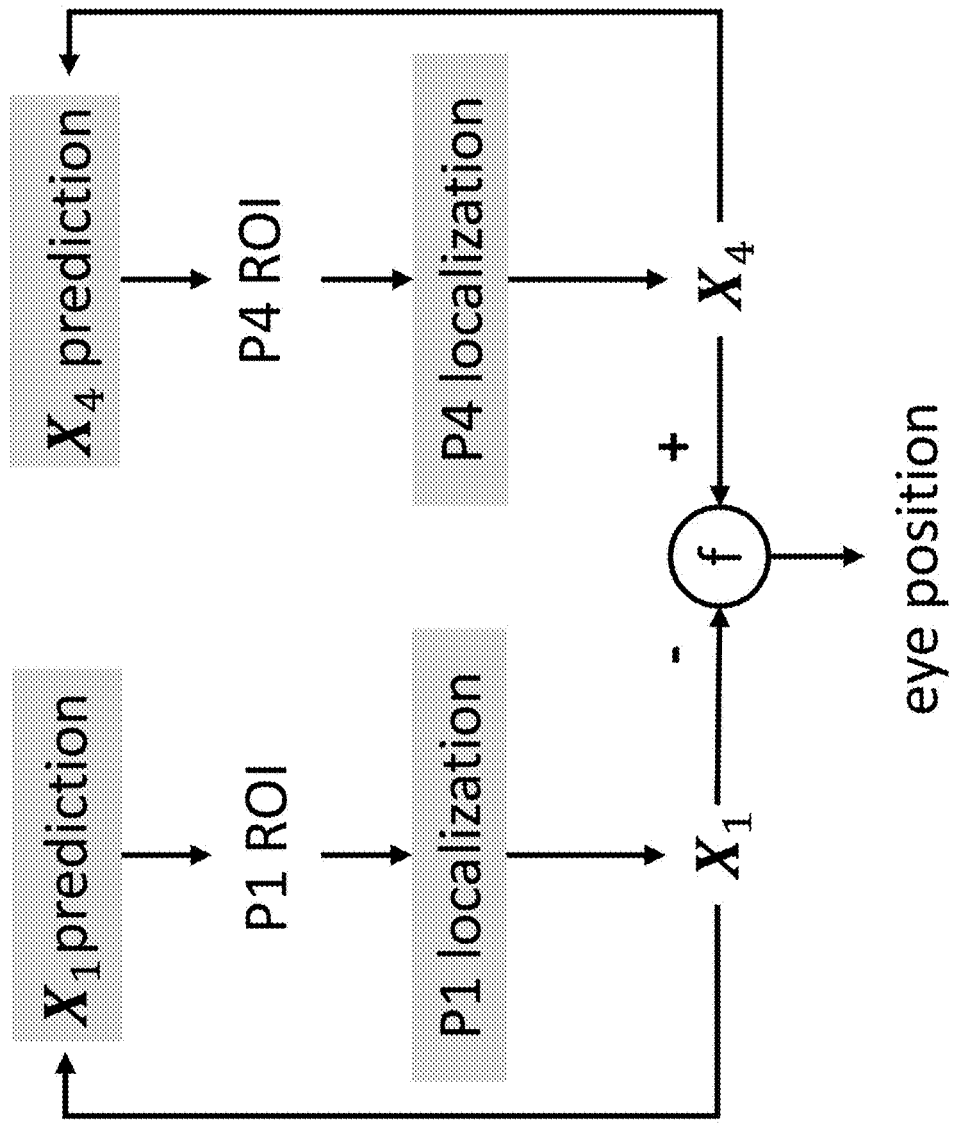
FIG. 2A shows a flow diagram of a method according to the Application based on measurements of P1 and P4.

In some embodiments, particularly applications at high frame rates (e.g. 500 Hz or higher) with limits in the computational load, the method directly relies on the digital measurements of P1 and P4. Robust location markers $X_1$ and $X_4$, where X denotes a two-dimensional variable referring to a position on two Cartesian axes of the imager output, are identified in each observation from the imager, as described below. At each frame, the output of the method is estimated as $f(X_4-X_1)$, where $f$ indicates conversion of the coordinates of the imager output into a direction of the line of sight. FIG. 2A shows a diagram of this method which relies on the digital measurements of P1 and P4.

The conversion function $f$ is based on an optical model of the average human eye. According to this model, the difference $X_4-X_1$ is proportional, on each Cartesian axis to $\sin(\theta)$, where $\theta$ is the eye rotation relative to a head-centered reference frame. The parameters off can be tuned to each individual eye using a preliminary calibration in which the observer sequentially looks in at least two predetermined directions. This method ensures accurate measurements of eye rotations for each individual observer.

In embodiments in which precise gaze localization is desired, the parameters of the mapping $f$, typically an average mapping $f$, are further refined by an optional second calibration process that includes showing a location to the observer; and following the step of running, calibrating the gaze tracking process to set or correct at least one offset based on the feedback provided by the observer on the accuracy of gaze localization. This method ensures accurate localization of the line of sight in the scene viewed by the observer.

Figure 2B:
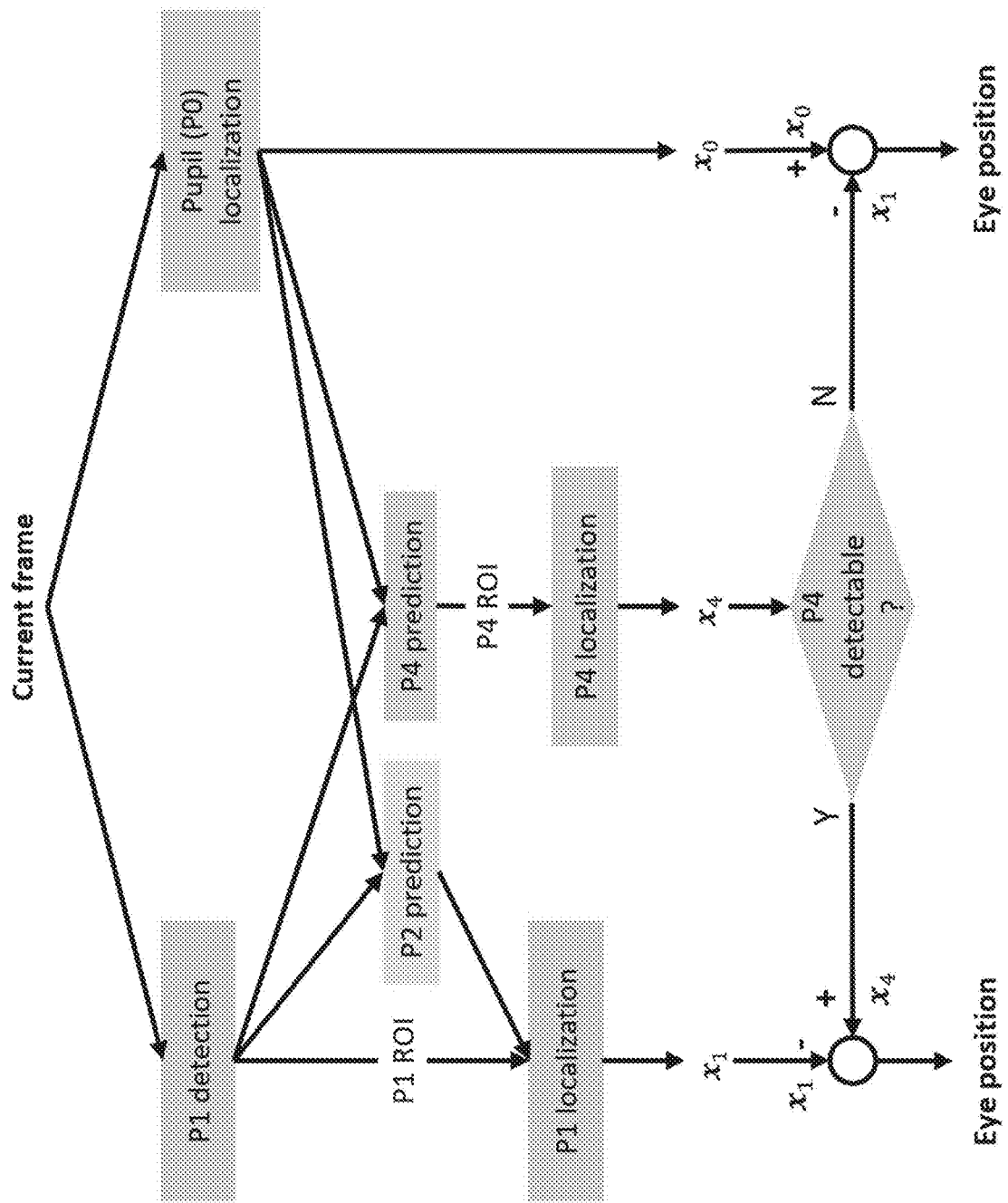
FIG. 2B shows a global flow diagram of another exemplary method according to the Application.

In another embodiment, three specific features in the image of the eye are used in the process of gaze tracking. In addition to the first (P1), and the fourth (P4) Purkinje reflections of an illuminator, the position of the pupil (P0) is also used. P0 can be used in one of two ways or both: a) to enlarge the tracking range beyond the range allowed by P4, as explained below; b) to predict the position of P4. This prediction to increase the robustness of tracking and reduces the computational load of the tracking process, as it enables restriction of the area in which P4 can be found to a narrow region of interest (ROI). Furthermore, use of P0 to predict P4 enables tracking at lower frame rates. In this case, P4 may move considerably in between successive frames and determination of its location based on the measurements at the previous time steps is not reliable. FIG. 2B shows a global flow diagram of a general approach of the method.

The specific way these three features are combined to yield the gaze position depends on gaze eccentricity. A DPI approach is used for non-eccentric gaze relative to the resting eye position. A standard pupil-first corneal reflection approach is used in more eccentric positions. Estimation of the markers locations, $X_0$, $X_1$ and $X_4$, depends on the data acquired by the imager and the predictions from an internal eye model. The new method uses the central region of the visual field, the ~45° region around the resting eye position where P4 is not obscured by the pupil. In this region, all three features can be imaged simultaneously and used synergistically to estimate the position of gaze. This is the region of most interest to the new method.

Outside of the central region, when gaze P4 is no longer visible because gaze is too eccentric, the line of sight is estimated only on the basis of the position of the pupil and the first Purkinje image P1. This is a standard approach often used in commercial eye-trackers. Thus, the new method allows precise gaze tracking over a large visual field, including a gaze outside of the central region.

For eccentric gaze positions relative to the resting eye position, the method has a precision about the same as most commercial eye-trackers, however, in the internal region where the new DPI approach of the system and method of the Application can be used, a precision which is far superior to commercial eye-trackers. Note that eccentric gaze positions tend to occur rarely during natural viewing, when the resting eye position is straight ahead, especially when the head is allowed to move freely.

In another embodiment, when high precision in tracking is desired, a fourth feature is also used: the second Purkinje reflection of the illuminator (P2; the reflection from the back of the cornea). In the imager's output this feature often partially overlaps with P1. The additional estimation of P2, therefore, provides a way to reduce the influence of this source of error in determining the P1 location marker $X_1$. Use of P0 and approximate knowledge of P1 is sufficient to determine the position of P2 relative to P1. Thus, use of P0 and approximate knowledge of P1 enables determination of which portion, if any, of the P1 data are affected by P2 and allows discarding (or attenuating) their contribution in the determination of $X_1$.

The new method includes parametrizing selected features by using positional descriptors (location markers) that indicate the location of each feature within the image. A location marker is used for each of the three features: the pupil ($X_0$), P1 ($X_1$) and P4 ($X_4$), (and in some embodiments P2 ($X_2$)) where use of bold denotes two-dimensional variables that indicate the position on the two Cartesian axes of the image. Location markers should (a) be strongly robust to changes in shape of the features and (b) reliably detected also from portions of the images of each feature.

The process described hereinbelow extracts the center of the pupil and center of radial symmetry for P1 and P4. However, any suitable location markers, such as the center of mass or centers of models fitted to the feature shapes, can also be used. Several of these markers have been tested in prototypes, and it is clear that the overall precision of tracking depends on the degree by which these descriptors are capable of tolerating noise in the images. Resolutions higher than one minute of arc, far superior to the prior art on DPI approaches used in specialized research laboratories, can be achieved with the markers described here.

As illustrated in FIG. 2B, an exemplary embodiment of an estimation of gaze position uses the following steps:

A) Rough localization of P1 and definition of its region of interest (P1 ROI). This is a narrow region around P1 that ensures optimal behavior of the parametrization process algorithm.

B) Estimation of $X_0$, the location marker of the pupil.

C) Based on A) and B), use the internal eye model to predict the rough locations of the second and fourth Purkinje images, P2 and P4 (P2 and P4 ROIs). P4 provides tracking gaze, and in some embodiments, P2 can be used to refine the estimate of P1 in applications of the method in which extreme precision is needed.

D) Parametrize P1 by estimating its location marker $X_1$. Knowledge of a region of interest (ROI), a region in which P1 is bound to be found, is used to reject possible artifacts.

E) Estimate $X_4$ from the imager's data using knowledge of the P4 ROI; and

F) If step E succeeds (gaze not eccentric) output gaze position based on $X_4$-$X_1$. Otherwise output the gaze position as $X_1$-$X_0$.

Estimation of gaze position via the relative motion between the first and fourth Purkinje images is the basis of the classical DPI approach. This estimation of gaze position is a robust method, as unlike most other eye-tracking approaches it is largely insensitive to translations of the eyes relative to the illuminator (although, small translations always occur even when the head is immobilized or in head mounted devices. Tolerance to translations make the DPI method robust and suited to perform head-tracking in head-mounted displays). P1 and P4 tend to move by similar amounts for eye translations, whereas they move relative to each other for eye rotations. Thus, within the central region of non-eccentric gaze, the new method of the Application belongs to the DPI family of eye-tracking approaches, but with additional new strategies for generating and estimating $X_4$ and $X_1$, which are more accurate, robust, and applicable to a much broader set of systems than previous approaches For eccentric gaze locations, where $X_4$ cannot be reliably estimated, the approach follows the standard method of tracking the difference between $X_1$ and $X_0$. Approaches already described in the literature for minimizing errors in $X_0$ can be applied to this case.

Components of the exemplary method of FIG. 2B are now described in more detail.

P1 detection: Processing of P1 relies on two stages. Detection is the first stage, which includes a rough estimation of P1 position from the entire image provided by the camera. This stage searches for possible edge points of the P1 reflection and use a subset of self-consistent candidates to fit a simple model of P1 (a circle in our prototype). Other candidate points are rejected as noise, typically spurious reflections from the eyelashes or other parts of the eyes. This approach provides a rough but robust estimation of P1 location in the image and is used to determine the region of interest (ROI) in which P1 is likely located.

P0 localization: The position of the pupil is used in two cases: (a) to estimate gaze position for eccentric gazes, when P4 is not available; and (b) to predict the position of P2 and P4 in the image of the eye. Pupil localization follows a strategy similar to that used for detection of P1. Edge points of P1 are first found out of the whole frame. Then an ellipse is fitted based on a subset of optimally self-consistent points. The remaining edge candidates are excluded as the outcome of noise.

P2 prediction: P2 often overlaps with P1, leading to displacement errors in locating the P1 positional marker. P0 and P1, together with an internal eye model, enable prediction of the position of P2 in the image. This knowledge is then used in the process of P1 localization to increase the accuracy of the estimate by subtracting P2 contributions to the imager's data.

P4 prediction: P4 is a difficult feature to extract and track, because it is both small and with low intensity. Searching for P4 in the entire image can easily lead to false alarms in addition of being computationally intensive. Thus, there is a need for a better, faster, and more computationally efficient way to find P4.

Figure 3A:
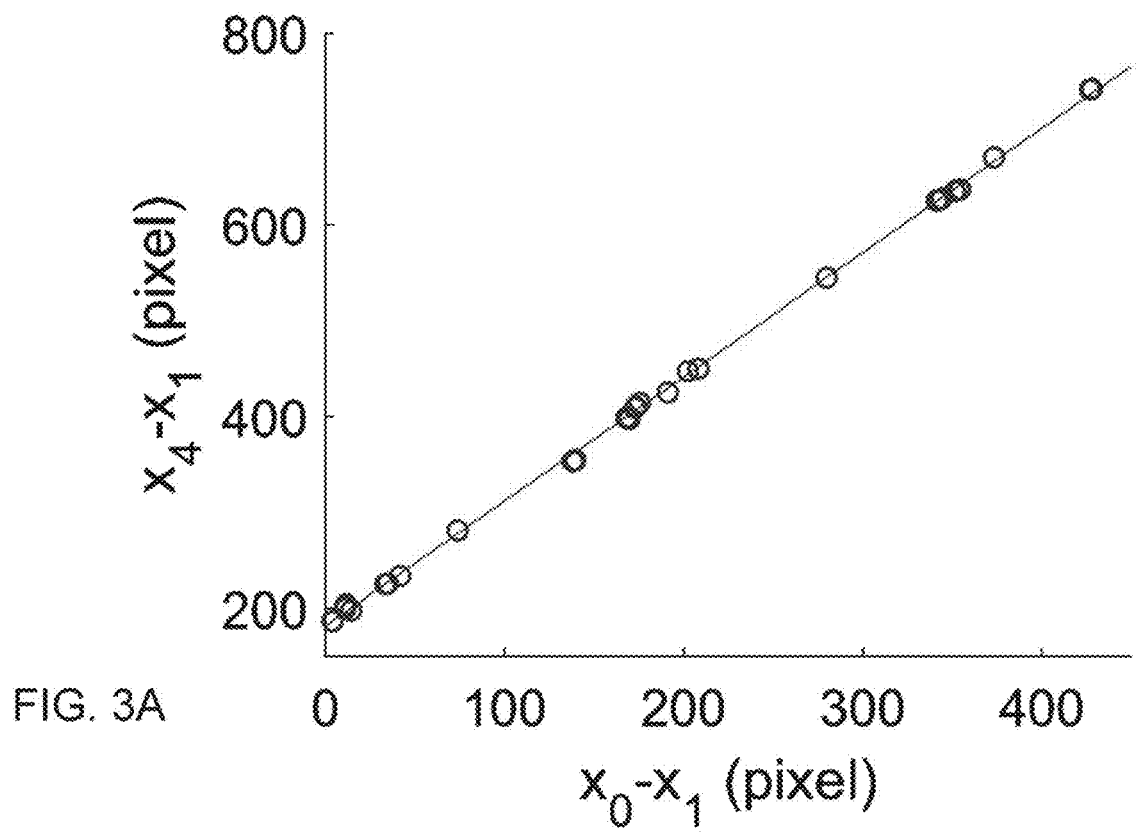
FIG. 3A is a graph showing the horizontal linear relationship between P4 and Pupil P0 position with reference to P1.
Figure 3B:
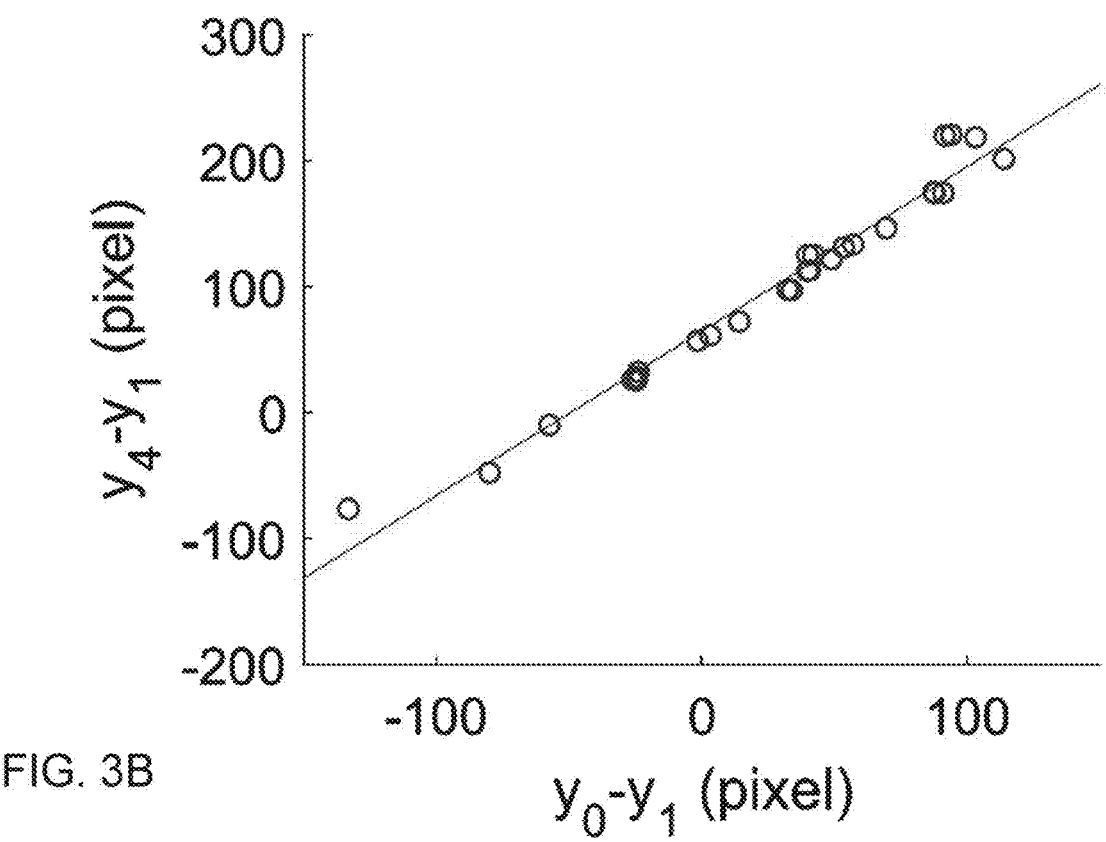
FIG. 3B is a graph showing the vertical linear relationship between P4 and Pupil P0 position with reference to P1.

It was also realized that an initial determination of a region of interest where P4 is likely to be found (P4 ROI) can provide a cost effective and computationally efficient way to locate P4. This new method solves the complex and costly P4 location problem within the entire frame of the imager. The new method first estimates P4 ROI, and then restricts localization process algorithms to this region. The eye model predicts that (X0-X1) and (X4-X1) are monotonically and almost linearly related, a relationship confirmed by the data collected with our prototype as shown in FIG. 3A and FIG. 3B. That is, given the positions of the pupil ($x_0$, $y_0$) and P1 ($x_1$, $y_1$), we can predict P4 ($x_4$, $y_4$) as:

$$\begin{bmatrix} x_4 \\ y_4 \end{bmatrix} = \vec{k} \left( \begin{bmatrix} x_0 \\ y_0 \end{bmatrix} - \begin{bmatrix} x_1 \\ y_1 \end{bmatrix} \right) + \vec{b} + \begin{bmatrix} x_1 \\ y_1 \end{bmatrix}$$

where the individual gains and offsets, $\vec{k}$ and $\vec{b}$, are average eye parameters that can be individually tuned during a calibration procedure. Nonlinear monotonic functions can also be fitted and used for prediction of P4 as well as any suitable function that predicts the position of P4 based on current knowledge of the positions of P1 and P0.

FIG. 3A and FIG. 3B are graphs showing the linear relationship between P4 and P0 position in reference of P1. FIG. 3A is a graph showing the horizontal linear relationship between P4 and P0 position in reference of P1. FIG. 3B is a graph showing the vertical linear relationship between P4 and P0 position in reference of P1. Each data point corresponds to a frame of Purkinje image recorded by our prototype eye tracker. The linear approximation holds on both horizontal (FIG. 3A) and vertical axes (FIG. 3B).

P1 localization: In the second step of processing of P1, a P1 location marker is estimated. Having already defined a region of interest around P1 in which spurious reflections are limited, the localization process algorithm can now be tailored to operate more efficiently. The major source of noise will come from P2, the location of which is already predicted. This knowledge of the major source of noise allows for substantial elimination of, or at least an assignment of a lower weight to the region of the P1 ROI potentially corrupted by P2. A powerful approach relies on estimation of the center of radial symmetry for P1, a method that enables to directly discard contributions from the points affected by P2. Alternatively, less computationally intensive applications can use more standard markers, such as the centroid, in which parts of the P1 image affected by P2 can be down-weighted. Several such features have been tested in prototype implementations.

P4 localization: The same process algorithm used to localize P1 can also followed for P4. Again, estimation is now restricted to the selected ROI, which limits errors from possible spurious reflections. Unlike P1, P4 is not affected by other Purkinje reflections in the image acquired by the camera.

System Description

In one embodiment, the system includes two integrated components: (a) an opto-electronic platform with the components responsible for generating the features that are tracked during eye movements; and (b) at least one processor (in some embodiments the processor of a GPU) to run at least one process algorithm which accurately distinguish the selected features from possible artifacts and follow their positions at high speed.

Device Description

Figure 4A:
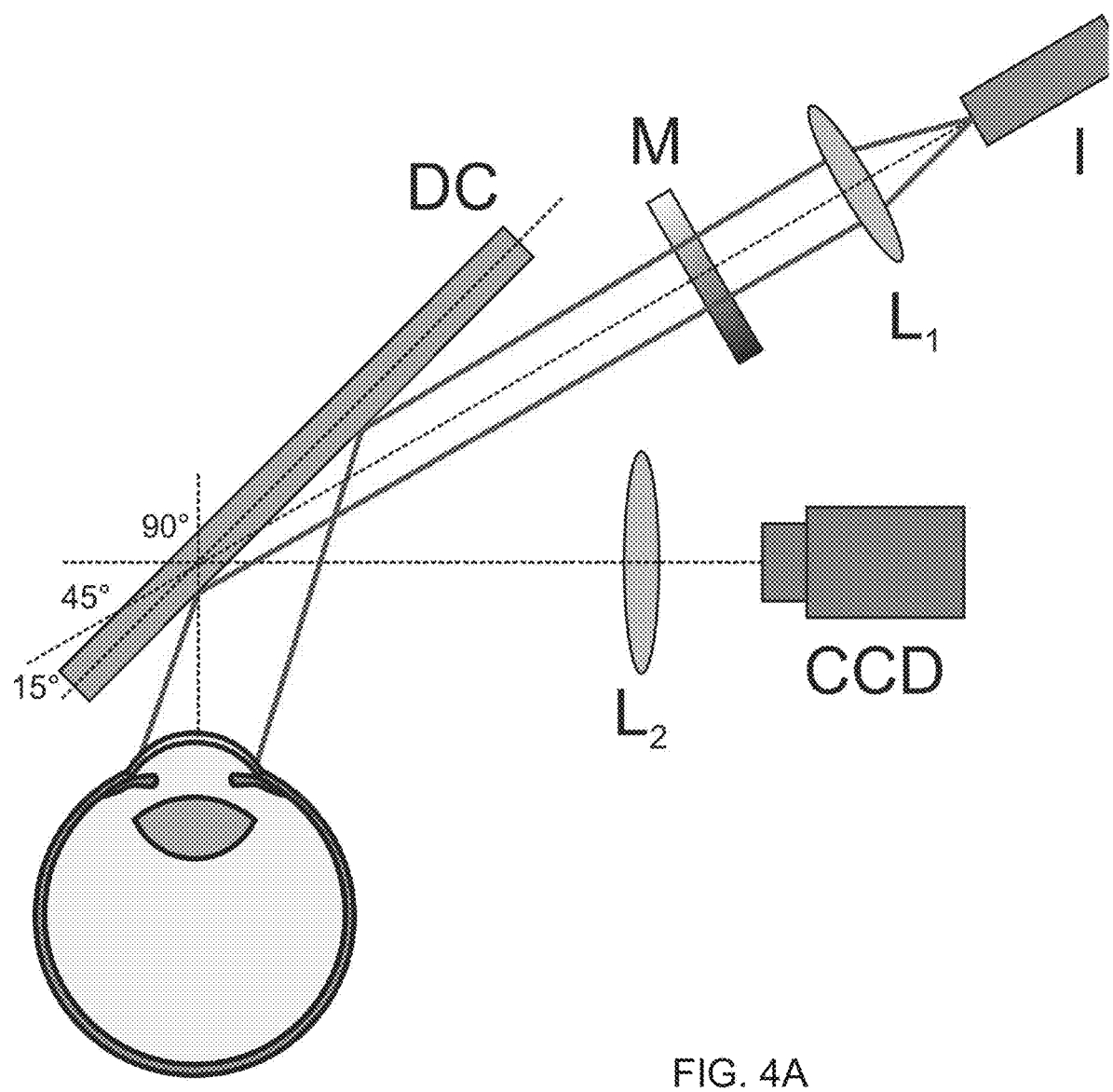
FIG. 4A is a schematic diagram showing an exemplary layout of a hardware platform suitable to perform the new method of the Application.

Opto-electronic components—FIG. 4A is a schematic diagram showing an exemplary layout of a hardware platform suitable to perform the new method of the Application. Optical and electronic components of the system include: illuminator I; optical lenses L1, L2, a long-pass mirror DC, and a shaping mask M.

The illuminator can be any suitable a light source for illuminating the eye to generate the image features tracked by the process algorithms. The illuminator can be either a coherent or incoherent point light source, or any combination thereof. In applications where the illuminator should remain invisible, an infrared LED can be used as the illuminator. The illuminator should ensure that both P4 and P1 are clearly visible, despite their very different intensity levels (typically P1 is 100 times stronger than P4). As demonstrated by our prototype, clearly visible P4 and P1 can be comfortably achieved with very safe illumination. In fact, we found that the power level can be a small fraction of the intensity levels allowed by IEC standards. The illuminator is typically mechanically mounted to a mechanical structure of the device.

A collimating lens L1 can be used to tune the light beam and to ensure that the light source appears at optical infinity with respect to the eye. Small deviations from collimation are beneficial, as they allow to increase the intensity of P4 while slightly attenuating the intensity of P1. This effect can provide better system performance during tracking. Most commercial low-power lasers come with their own collimating lens, which can be slightly adjusted for use as collimating lens L1. Any suitable collimator can be used. The first lens L1 is typically disposed in an optical path from the illumination source to the dichroic mirror.

Optional mask M shapes the light source and the Purkinje image by creating 2D patterns that can be easily tracked. The mask approach can be used to enhance the resolution and robustness of the tracking process algorithm. Any suitable mask can be used.

One, or both of optional polarizers Z1, Z2 (FIG. 7A) can be placed in front of the light source and camera to enhance the image quality. Polarizers Z1, Z2 polarize the light to reduce the intensity of the first Purkinje image and remove noise, such as noise scattered by eye lash or a contact lens.

A dichroic mirror can be used to illuminate and image the eye while leaving the optical path unobstructed. The dichroic mirror is typically a short-pass mirror that reflects the infrared light to the camera. Visible lights will pass the dichroic mirror and normally reach to the eyes. Use of a dichroic mirror allows for an optical separation of system components from the visible wavelength path, enabling the observers to freely look at the visual scene in front of them. The dichroic mirror is typically mechanically mounted to a mechanical structure of the device in an angular relation to an axis of a light direction from the illumination source.

Lens L2 can be used to create an image of the eye illuminated by infrared source on the sensor of a digital camera. In some embodiments, to achieve maximum resolution, lens L2 can magnify the image of the eye to cover substantially the entire CCD sensor with a relevant portion of the eye. Lens L2 is typically disposed in a light path between the dichroic mirror and the camera or an imager.

Any suitable lenses, L1, L2, can be used. Moreover, it is understood that either of lenses L1 or L2 can be integral to an illumination source, or a cameral or imager respectively.

A digital camera can be used to acquire images of the eye. The camera's resolution determines the precision of the approach. Using process algorithms, such as those described hereinbelow, a 2 Mb camera enables resolution higher than one minute of arc (arcmin). The camera's frame rate determines the speed of tracking. The new method enables both low and high tracking rates. For example, the new system and method has already been tested to a frame rates of 140 Hz and 1 KHz. Any suitable camera or imager can be used. The camera or imager is typically mechanically mounted to a mechanical structure of the device in an angular relation to a surface of the dichroic mirror.

Figure 4B:
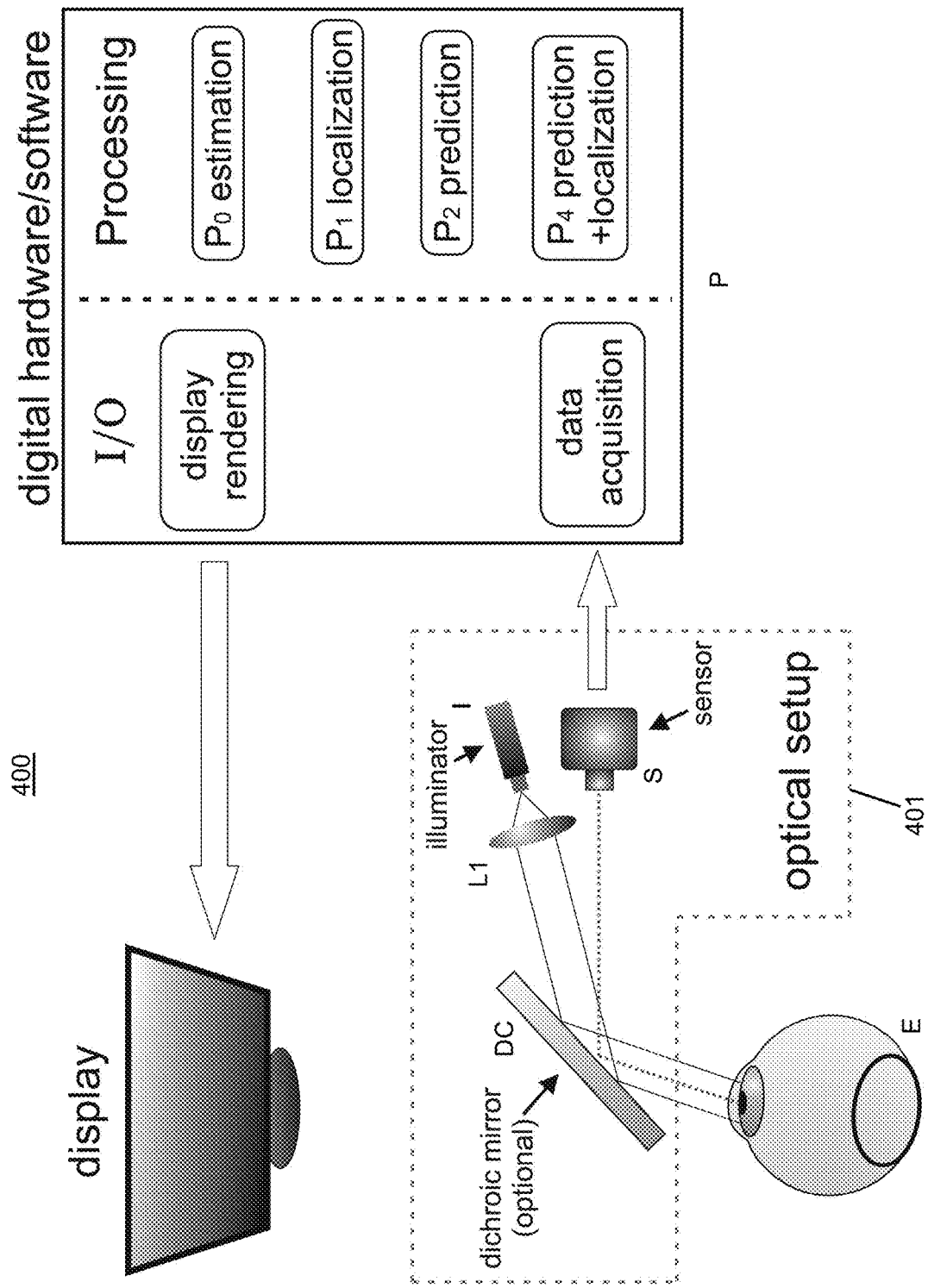
FIG. 4B is a block diagram showing an exemplary gaze tracking system according to the Application.

FIG. 4B is a block diagram showing an exemplary gaze tracking system 400 according to the Application. As in FIG. 4A, a gaze tracking system includes a gaze tracking device 401 illustrated by the optical setup within the dashed lines. The gaze tracking device 401 includes a mechanical structure (mechanical structure not shown in FIG. 4B, See, for example, FIG. 5A-FIG. 5D, FIG. 7A) adapted to position the gaze tracking device 401 in a substantially fixed physical relation to a head of an observer whose eye "E" is shown in FIG. 4B. An illumination source I is mechanically coupled to the mechanical structure. The illumination source is adapted to illuminate eye E of the observer at an angle of about 20 degrees to 40 degrees relative to a resting eye position. A lens L1 is disposed in an optical path of the illumination source I. Any suitable sensor S, such as, for example, a camera, an imager, a laser scanner, includes at least one focusing lens. The focusing lens can be discrete in the optical path of the sensor, or more typically is mechanically coupled directly or indirectly to the sensor. In FIG. 4B, the focusing lens is understood to be integral to the sensor body. The camera or imager is mechanically coupled to the mechanical structure and adapted to image the eye E. A processor P is configured to run at least one gaze tracking process adapted to locate at least two or more Purkinje reflections of the illuminating source I. Display D can be used to display the tracking results, to display calibration targets, and/or to display a virtual reality (VR) scene. Processor P runs at least one gaze tracking process according to the new methods for determining gaze location as described in detail hereinabove.

The new system and method of the Application can be used both in applications in which the observer's head can be immobilized (head-fixed applications) and in situations in which the observer needs to freely move their head (head-free applications). Different ways of mounting the elements are required in the two sets of applications. Typically, a mechanical structure is used to position at least some of the components of the gaze tracking device in a substantially fixed physical relation to a head of an observer.

Figure 5A:
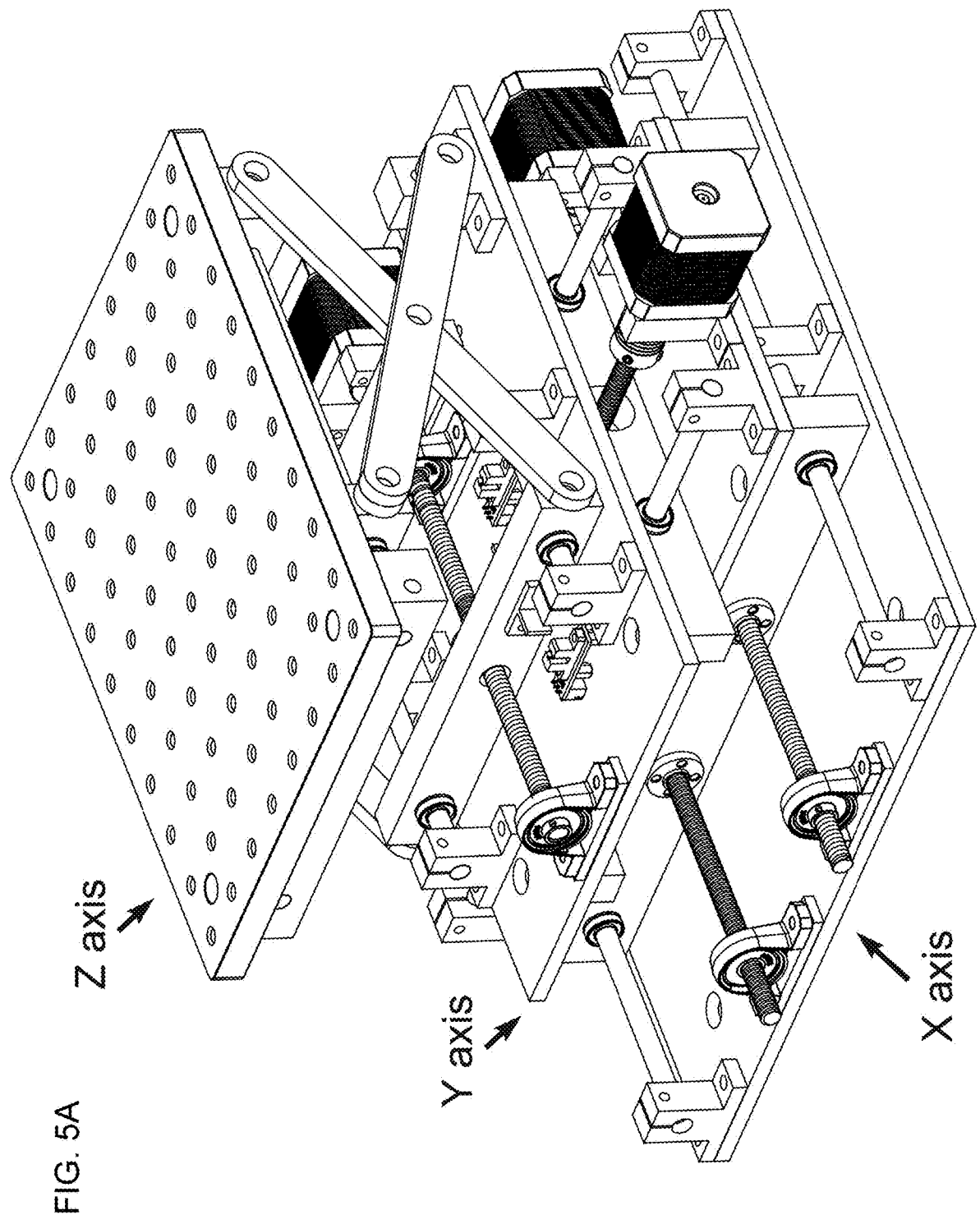
FIG. 5A is a drawing showing an exemplary table mounted device.

Head-fixed platform: When the head of the observer can be immobilized, the system can be mounted on a mobile platform that allows precise positioning of the optical components relative to the observer's eye. Before use, the camera is typically moved by means of a platform, so that the image will be in focus. An exemplary motorized platform was successfully used in the prototype system illustrated in FIG. 5A and FIG. 7A. Any suitable adjustable platform can be used, such as, for example, any suitable configuration that enables a precise linear motion on three orthogonal axes. FIG. 5A (See also, FIG. 7A) is a drawing showing an exemplary table mounted device. The system sits on a platform with three linear degrees of freedom. By enabling translations on the x, y, and z axis, this platform aligns the optical components to the eye of the observer.

Figure 5B:
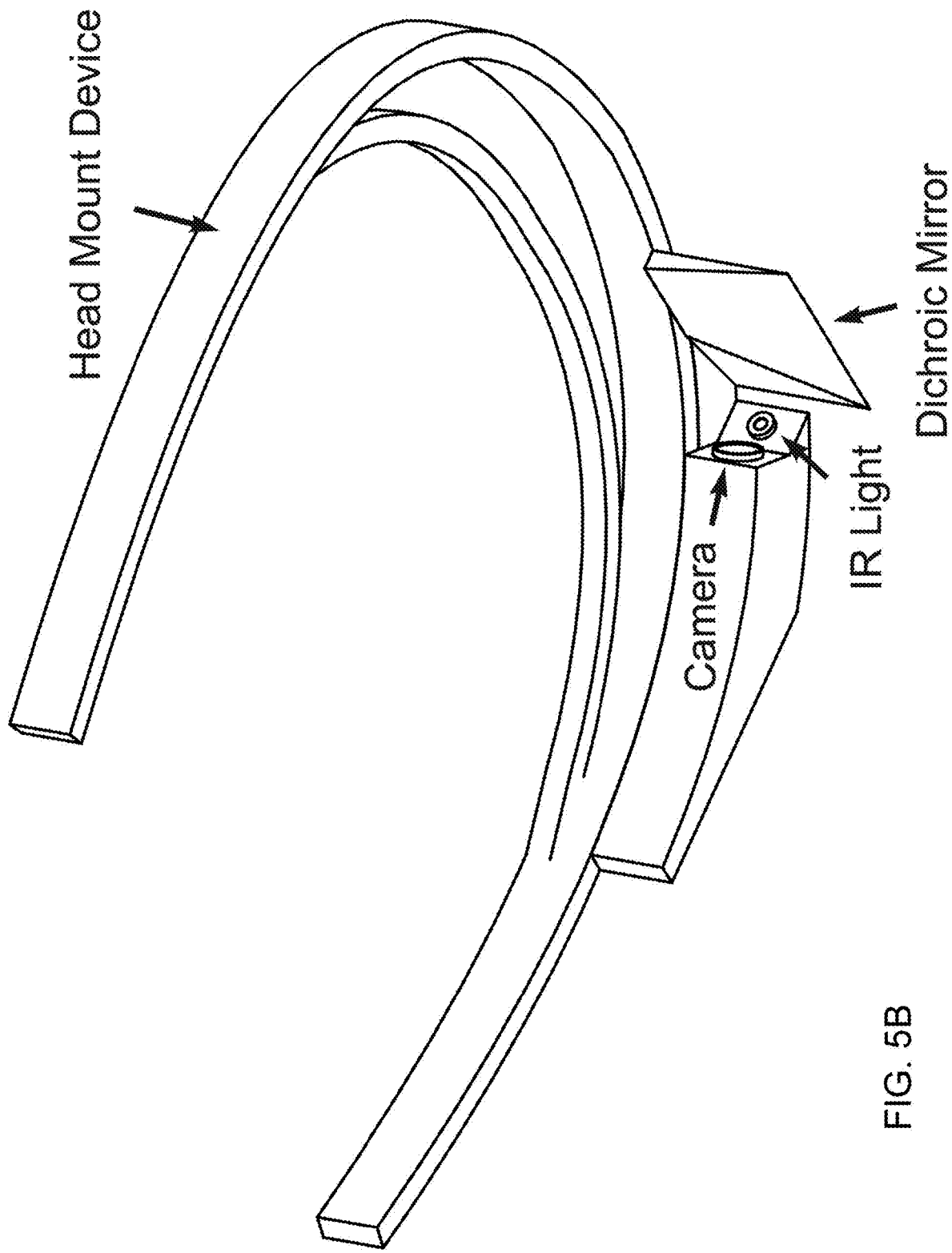
FIG. 5B is a drawing showing an exemplary head mounted device.

Head-mounted platform. The system can also be mounted directly on the head of the observer. In this head-mounted platform case, precise alignment with the eye is substantially guaranteed by the way the device is worn by the observers. Sufficiently small optical and electronic components can be installed on or more typically within a typical virtual reality display. FIG. 5B is a drawing showing an exemplary head mounted device. The same components can be directly mounted on, or more typically within a helmet or glasses worn by the observer. Any suitable head worn structure can be used. Typical suitable head worn structures include helmets, bands, head bands, glasses, glass frames, or any combination thereof. A pair of glasses can be provided as a single traditional eyeglass frame with at least one optical port for at least one eye of a human observer, or more typically having an optical port for each of a human observer's eyes. However, where the observer does not use or need a conventional lens to correct the eyesight of the observer, there can be a neutral lens or any other substantially transparent material, or no lens at all.

Figure 5C:
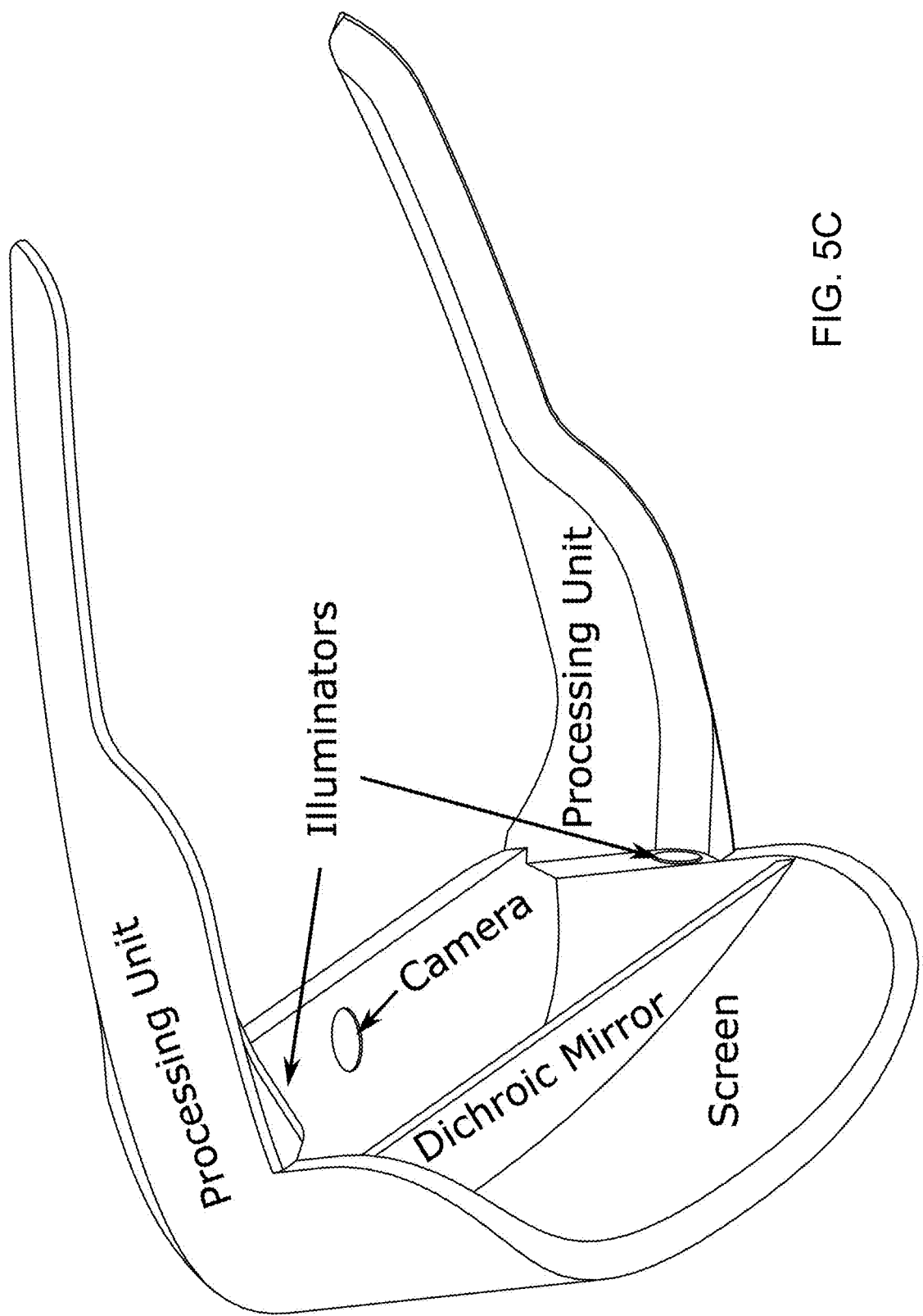
FIG. 5C is a drawing showing an exemplary virtual reality (VR) headset.

FIG. 5C is a drawing showing an exemplary VR headset. In the exemplary VR headset of FIG. 5C, a single camera is mounted in the helmet looking at the two eyes from above. There are two separate illumination sources, one on each side illuminating each eye via a dichroic mirror in front of both eyes. The processor can be included onboard the headset, such as, for example in either or both of the side parts of the headset (analogous to the "temples" of eyeglasses).

Figure 5D:
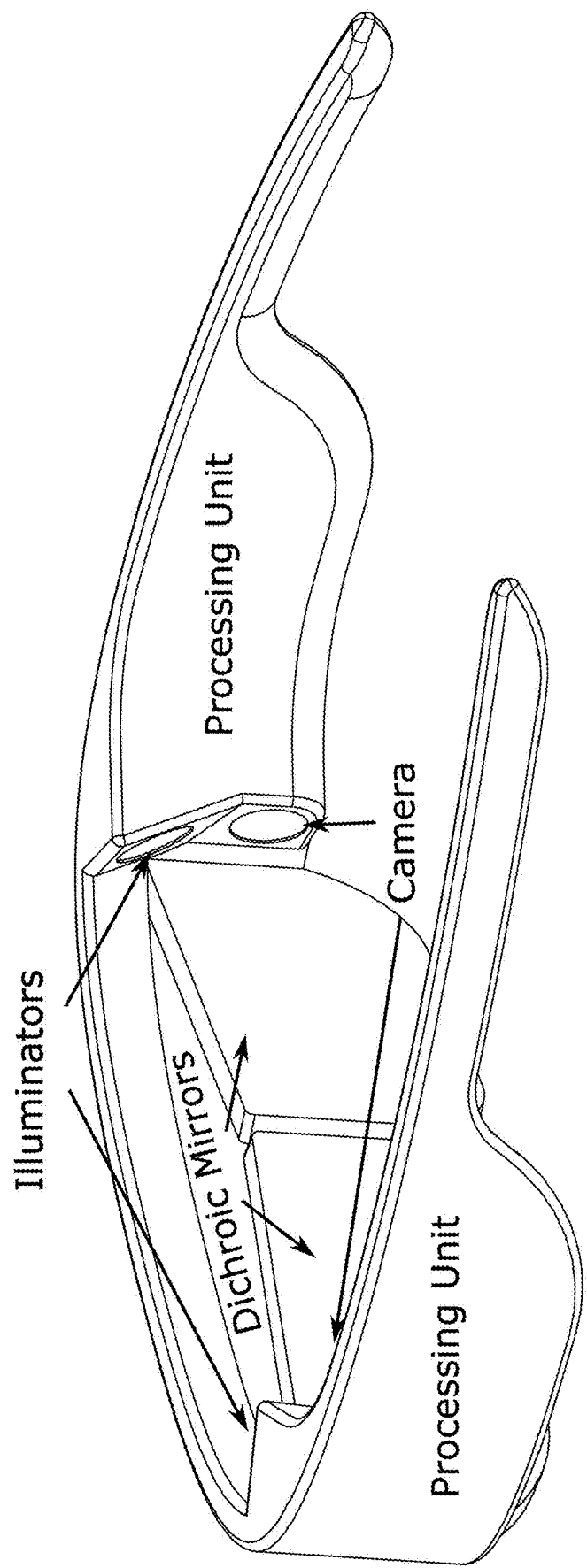
FIG. 5D is a drawing showing an exemplary augmented reality (AR) headset.

FIG. 5D is a drawing showing an exemplary augmented reality (AR) headset. In this exemplary embodiment, an observer can see a scene in front through a pair of dichroic glasses. There are two illuminators and two cameras mounted on the side temples. The processor can also be included onboard the headset, such as, for example in either or both of the side temples of the headset.

In embodiments where both eyes are tracked, the hardware can be duplicated for both eyes. However, components can be shared and/or multiplexed in time. For example, there can be one common camera or imager, either imaging both eyes simultaneously (e.g. FIG. 5C), or directed by any suitable means, optical and/or mechanical to either eye at a time over time. Where both eyes are simultaneously imaged, relevant portions of the eye of being tracked can be extracted from an image of both eyes.

In any of the embodiments, there can also be used any suitable filter materials, such as for example a filter glass having any suitable filter properties or parameters. For example, in a head-mounted platform there can be corrective lenses in a frame, such as a frame of a pair of eyeglasses, clear or neutral materials, any suitable optical filters, or any combination thereof.

Gaze-tracking strategy—An exemplary computationally efficient implementation of the strategy hereinabove is now described in more detail.

Figure 6:
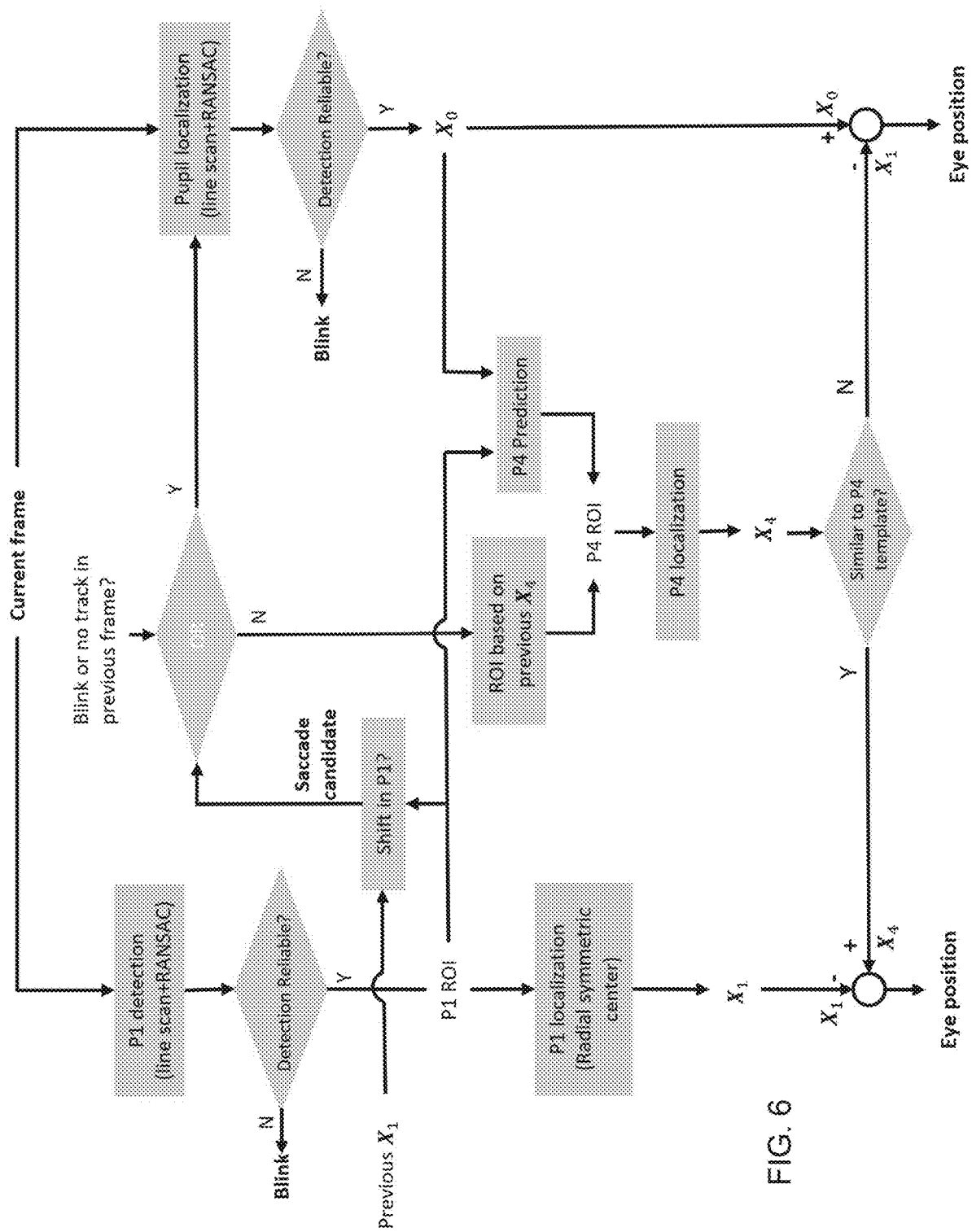
FIG. 6 is a flow diagram showing an exemplary computationally efficient implementation of an eye tracking process algorithm.

The overall scheme for one exemplary embodiment of the method is illustrated in FIG. 6.

FIG. 6 is a flow diagram showing an exemplary computationally efficient implementation of the eye tracking process. Parameters are estimated at selected times during eye movements by means of process algorithms to limit computational costs and implemented in a parallel format. For efficiency, the exemplary approach performs steps of: (a) the general strategy only when they are strictly necessary; and (b) uses computationally effective methods for extracting the features of interest and estimating their parameters. These are methods that involve a limited number of steps by design and can be easily parallelized to take advantage of modern processing units.

Parsimonious estimation of features is possible because of the very properties of the way humans move their eyes, with rapid gaze shifts (saccades) separated by intervals of little motion of the eye (fixations). During fixation, the human eye moves incessantly because of different types of eye movements, which, however, tend to maintain the line of sight within the same region. As so implied, it was further realized that the predictions of the P4 ROI and P2 position do not need to be updated at every frame, but one can rely on the predictions made at the onset of fixation. In practice, use of the model predictions can be restricted to the frame following the detection of events that interrupt the ongoing fixation (blinks and saccades) or losses of track in P4.

The exemplary process algorithms described in more detail hereinbelow operate by processing individual lines in the image of the eye. Points of interest from these lines are first extracted in parallel and randomly selected subsets are then used to fit models (circles and ellipses). This process is repeated multiple times to determine the model that most reliably fits the data while allowing for possible outliers from spurious reflections. This random iterative strategy is similar to general approach of the RANSAC (RANdom SAmple Consensus) process algorithm. It is a method that can be readily parallelized and implemented, for example, in the CUDA (a compute unified device architecture) on fast GPU. CUDA® is a parallel computing platform and programming model developed by NVIDIA (NVIDIA Corporation of Santa Clara, Calif.) for general computing on graphical processing units (GPUs).

P1 processing—P1 appears in the images sampled by the camera as a saturated blob. In the exemplary embodiment, P1 is processed in two stages. P1 detection is a process algorithm that provides a quick and rough estimation of the P1 position and defines a region of interest (ROI). This estimation is later refined by a localization process algorithm that operates on the ROI and on the prediction of the internal model.

The first phase of P1 processing relies on sampling selected horizontal lines (N=200 in our prototype) of the portion of the eye image where P1 is known to vary. Each selected line is processed to give two points, ideally corresponding to the rising and falling edge of the P1 reflection. This is achieved by means of heuristics on the expected width of P1 (between 20 and 250 pixels in our prototype).

Analysis of the topography of the couples of points enables rejection of artifacts. This is possible because the most likely source of errors in the process are reflections from eyelashes, which typically concentrate in different regions of the image. Spurious reflections can be separated on the vertical axis by the presence of intermediate lines that do not contain possible candidate edges, and on the horizontal axis by the presence of more than a couple of flagged candidate points. Based on the criteria, lines can be processed to yield a subset of contiguous lines each containing a pair of flagged points. These points are assumed to correspond to P1 and used to estimate the P1 ROI. In the exemplary embodiment, a circle is fitted following the RANSAC procedure, to distinguish between compatible points and possible outliers. The center of the circle defines the center of the ROI (in our prototype a 256 pixels squared window). While the exemplary embodiment uses a circle, any suitable shape can be used with a proper mask, such as, for example, a square, rectangle, ellipse, polygon, etc.

Estimation of the P1 location marker, including estimating the point closest to the intersections among gradient lines along all possible axes, is then obtained by processing the ROI to estimate the center of radial symmetry. Because the P1 image is saturated, only the gray levels at its edges contribute to this estimation. The main source of error in this estimation comes from possible confounds from P2, when this reflection overlaps on P1. Use of the model allows for a rough prediction of the current position of P1 and identification of whether components of P1 need to be masked out in estimating the center of radial symmetry.

P0 processing—The pupil is processed following an approach similar to the one used for P1 but with opposite polarity. Because the pupil corresponds to the darkest region of the image, the process algorithm searches for portion of the image with gray levels below a pre-selected threshold. A similar line scan process algorithm to the one applied to P1 is now used to find N horizontal lines (N=40 in our prototype), which contain a sufficiently wide contiguous segment in which gray levels remain below threshold. These lines are assumed to represent sections of the pupil and are processed to each give two points, the rising and falling edge of the pupil.

These pairs of points are then used following the RANSAC procedure already described for P1 to fit an ellipse. The process is repeated multiple times to select the ellipse that best fits the data. Possible spurious points, primarily stemming from dark eyelashes, are eliminated as outliers in this process. The coordinates of P0 are defined by the center of the fitted ellipse, as known to those skilled in the art, a parameter that can be geometrically corrected for the offsets caused by changes in the camera's alignment relative to the eye for eccentric gaze.

P4 processing—P4 is a much smaller and weaker reflection than P1 and, therefore, difficult to localize within the entire image of the eye. For this reason, the process algorithms processing P4 operate within a small pre-selected region of interest surrounding P4. This region is defined on the basis of knowledge of the approximate positions of P1 and P0. In some embodiments, to speed up processing, prediction of the P4 ROI is not conducted at every frame of the camera, but only in three cases: (a) the occurrence of a saccade, detected as a shift in P1 above a predetermined threshold; (b) a blink in the previous frame, defined as an error in detecting P1; and (c) an error in tracking P4 in the previous frame. In other cases, the ROI is not updated under the assumption that the current estimate continues to hold. The ROI can be recentered at every frame, such as based on the center of mass of the ROI, to ensure that it remains centered on P4.

Once the P4 ROI is defined, the P4 position is determined by its center of radial symmetry, the same approach already described for P1. The result is then validated by template matching, which controls that the P4 image is similar to the one sampled during calibration. If the P4 image is similar to the template, the system provides its DPI output. Alternatively, P4 is rejected and the gaze position is given by the difference between P0 and P1.

Example

Figure 7A:
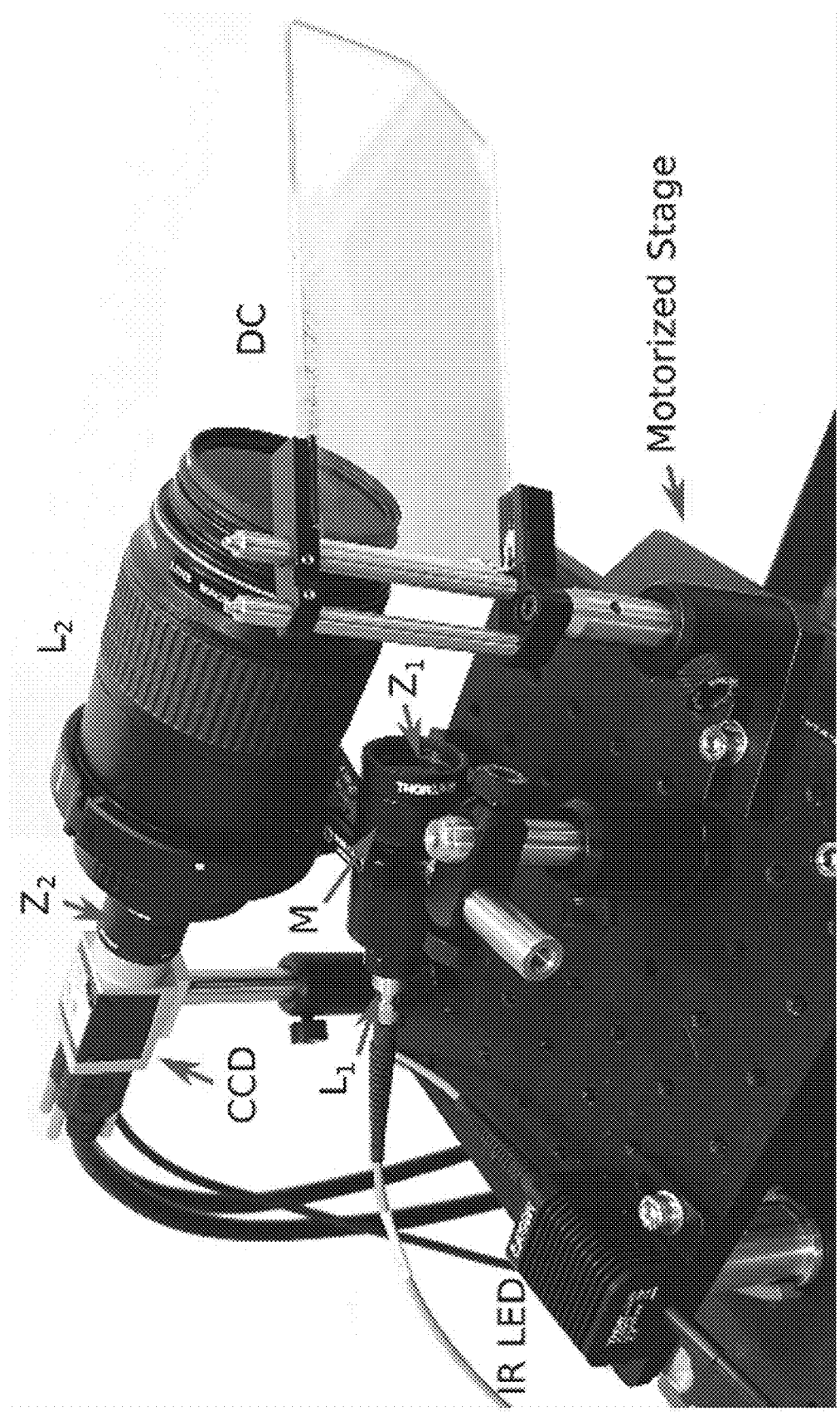
FIG. 7A shows a drawing of an exemplary prototype implementation of a system for real-time high-resolution eye-tracking.

A prototype was built to demonstrate the feasibility of the new system and method approach described hereinabove. FIG. 7A shows a drawing of an exemplary prototype implementation of a system for real-time high-resolution eye-tracking according to the new system and method of the Application. The system hardware includes: (a) a mechanical platform with optical components and a high-speed camera, and (b) a tracking process algorithm according to the Application, as described hereinabove. The tracking process algorithm typically runs on a fast GPU on a host computer.

The components used in this prototype were, M: Thorlabs SM1D12D Iris Diaphragm. IR LED: Thorlabs M850F2 IR fiber-coupled LED. DC: 700 short-pass dichroic mirror. Z1, Z2: Thorlabs LPNIRE100-B polarizer. L1: Thorlabs F280SMA-850 collimator. L2: Canon EF 100 mm f/2.8 Macro USM Fixed Lens. CCD: Basler ace acA2000-340km-NIR camera. The Thorlabs components are available from Thorlabs Inc. of Newton, N.J. Canon lenses are available from Canon, USA. Computer Specs of the exemplary prototype implementation: CPU: Intel® Core™ i7-6850K CPU @ 3.60 GHz. Motherboard: X99A GODLIKE GAMING CARBON, available from MSI Computer Corp. of City of Industry, RAM: 16 G, CA. GPU: Nvidia GTX 1080-Ti available from NVIDIA of Santa Clara, Calif. Hard Disk: 512G SSD.

Figure 7B:
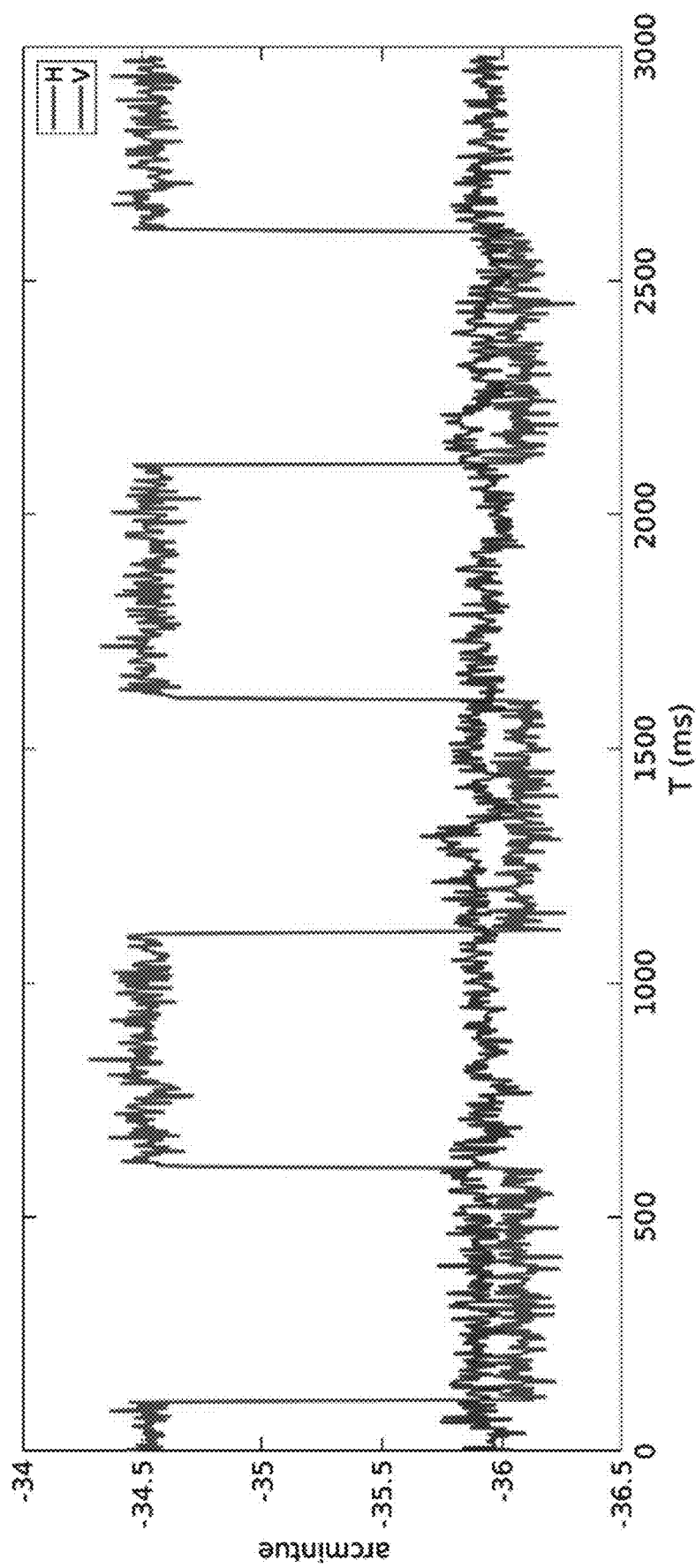
FIG. 7B is a graph which shows results obtained with the apparatus of FIG. 7A.

Extensive tests with both real and artificial eyes have shown an unsurpassed level of resolution of about 30 arcsec. FIG. 7B is a graph which shows results obtained with the apparatus of FIG. 7A, by moving an artificial eye by a square wave on the vertical axis.

In summary and stated in general terms, the new method for determining gaze location of the Application typically includes: A) providing a gaze tracking device including an illumination source to illuminate an eye of an observer at an angle of about 20 degrees to 40 degrees relative to a resting eye position of the eye, a camera or an imager including at least one focusing lens, the camera or imager to acquire an image of the eye, and a processor to run a gaze tracking process; and B) running the gaze tracking process to locate at least \wo or more Purkinje reflections of the illuminating source in the image.

Processor—Any suitable computer or computer processor can be used. While in the exemplary implementations, the processor was GPU parallel processor on a board (e.g. a board in a computer) communicatively attached to the new tracking device of the Application, the processor can also be disposed within the tracking device. While a parallel processor is desirable, neither a parallel processor nor a GPU are essential to the new device, system, and method. Suitable processors can include a microprocessor, a microcomputer, a CPU, a gate array programmed or configured as a processor, a logic unit configured as a processor by hardware and/or software to run a process, etc.

Firmware and/or software for a system and method according the Application can be provided on a computer readable non-transitory storage medium. A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for determining gaze location comprising:
providing a gaze tracking device comprising an illumination source to illuminate an eye of an observer at an angle of between about 20 degrees to 40 degrees relative to a resting eye position of the eye, a camera or an imager including at least one focusing lens, said camera or imager to acquire sequences of digital images of the eye, and a processor to run a gaze tracking process; and
running said gaze tracking process to determine said gaze location based on at least two Purkinje reflections of the illuminating source from at least two different surfaces of the eye in said digital images of the eye.

2. The method of claim 1, further comprising a step wherein an acquired frame or image is ignored on detection of a blink.

3. The method of claim 1, following said step of providing, tuning said gaze tracking process to an individual eye by a first calibration process wherein the observer looks in at least two directions.

4. The method of claim 1, following said step of providing, localization of a line of sight in a scene viewed by the observer is refined by an optional second calibration process that comprises showing a location to the observer; and following said step of running, calibrating said gaze tracking process to set or correct at least one offset based on the location shown to the observer.

5. The method of claim 1, wherein said step of running said gaze tracking process comprises:
performing a) and b) in any order, or in parallel:
a) estimating a P1 location marker $X_1$;
b) estimating a P4 location marker $X_4$, and
c) outputting a gaze position as $f(X_4-X_1)$, where X denotes a two-dimensional variable which indicates a position within an image of the eye, and $f$ is an average mapping function.

6. The method of claim 5, wherein said step a) comprises defining a P1 region of interest (ROI) to localize P1 to ensure a substantially optimal behavior of a localization parametrization process algorithm that yields $X_1$.

7. The method of claim 5, wherein said step c) further comprises predicting a P2 ROI to reject inaccuracies caused by P2 in estimating $X_1$.

8. The method of claim 5, wherein said P1 location of step a) and said estimating a P4 location step b) are performed in parallel on a parallel processor.

9. The method of claim 1, wherein said step of running said gaze tracking comprises:
performing a) and b) in any order, or in parallel:
a) defining a P1 region of interest (ROI) to localize a Dual-Purkinje Image (DPI) P1;
b) estimating $X_0$ to define a location marker of a pupil P0 image;
c) based on step a) and step b), predicting a P4 ROI;
d) estimating a P1 location marker $X_1$;
e) estimating a P4 location marker $X_4$ based on said P4 ROI; and
f) outputting a gaze position as $f(X_4-X_1)$, where X denotes a two-dimensional variable which indicates a position on two Cartesian axes.

10. The method of claim 9, wherein said step c) comprises predicting a P4 $(x_4, y_4)$ according to the equation $$\begin{bmatrix} x_4 \\ y_4 \end{bmatrix} = \vec{k} \left( \begin{bmatrix} x_0 \\ y_0 \end{bmatrix} - \begin{bmatrix} x_1 \\ y_1 \end{bmatrix} \right) + \vec{b} + \begin{bmatrix} x_1 \\ y_1 \end{bmatrix},$$

where average gains and offsets $\vec{k}$ and $\vec{b}$ are optionally refined during a calibration procedure.

11. The method of claim 9, wherein said step f) comprises outputting a gaze position as $f(X_4-X_1)$ if step e) succeeds; otherwise outputting said gaze position as $f(X_1-X_0)$.

12. The method of claim 9, where a ROI is based on a previous $X_0$.

13. The method of claim 9, wherein a P1 detection of step a) and a pupil localization of step b) are performed in parallel on a parallel processor.

14. The method of claim 9, wherein said step c) comprises predicting a P4 ROI on a basis of the pupil $X_0$ and $X_1$.

15. The method of claim 9, wherein the P1 and P4 ROIs are based on $X_1$ and $X_4$.

16. The method of claim 1, wherein said step of running said gaze tracking process further comprises continually updating an eye model to estimate a most likely orientation of the eye model based on said at least two Purkinje reflections in said digital images of the eye.

17. A gaze tracking system comprising:
a gaze tracking device comprising:
a mechanical structure adapted to position a gaze tracking device in a substantially fixed physical relation to a head of an observer;
an illumination source mechanically coupled to said mechanical structure, said illumination source adapted to illuminate an eye of the observer at an angle of between about 20 degrees to 40 degrees relative to a resting eye position;
a lens disposed in an optical path of said illumination source;
a camera or an imager including at least one focusing lens, said camera or imager mechanically coupled to said mechanical structure and adapted to image the eye; and
a processor configured to run at least one gaze tracking process adapted to locate at least two or more Purkinje reflections of the illuminating source from at least two different surfaces of the eye.

18. The gaze tracking device of claim 17, comprising a dichroic mirror disposed in an optical path of said camera or imager.

19. The gaze tracking device of claim 17, wherein said mechanical structure comprises a head-fixed platform wherein the head of the observer is substantially immobilized.

20. The gaze tracking device of claim 17, wherein said head-fixed platform comprises a motorized stage to position optical components of said gaze tracking device relative to an eye of the observer.

21. The gaze tracking device of claim 17, wherein said mechanical structure comprises a head-mounted platform mounted on the head of the observer.

22. The gaze tracking device of claim 21, wherein said mechanical structure comprises a helmet or a pair of glasses.

23. The gaze tracking device of claim 17, comprising a mask disposed on the optical path of the illumination source to the eye.

24. The gaze tracking device of claim 17, comprising at least one polarizing filter disposed within the optical path to the imager of said gaze tracking device.

25. The gaze tracking device of claim 17, wherein said illumination source comprises an infrared light emitting diode (LED) or a low-power laser.

26. A gaze tracking device comprising:
- a mechanical structure adapted to position a gaze tracking device in a substantially fixed physical relation to a head of an observer;
- an illumination source mechanically coupled to said mechanical structure, said illumination source adapted to illuminate an eye of an observer at an angle of between about 20 degrees to 40 degrees relative to a resting eye position;
- a lens disposed in an optical path of said illumination source; and
- a camera or an imager including at least one focusing lens, said camera or imager mechanically coupled to said mechanical structure and adapted to image at least two Purkinje reflections from at least two different surfaces of the eye.

* * * * *